Aug. 15, 1939.  W. M. COHN  2,169,355
COLOR-GRADING SYSTEM
Filed Aug. 17, 1936
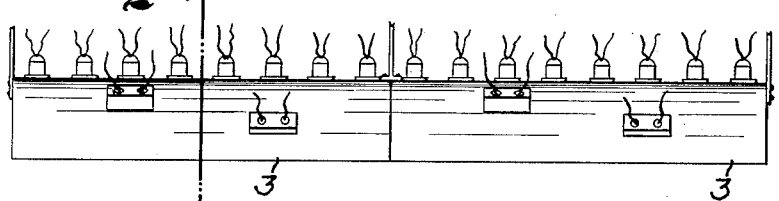
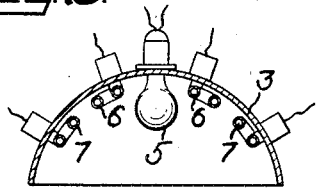
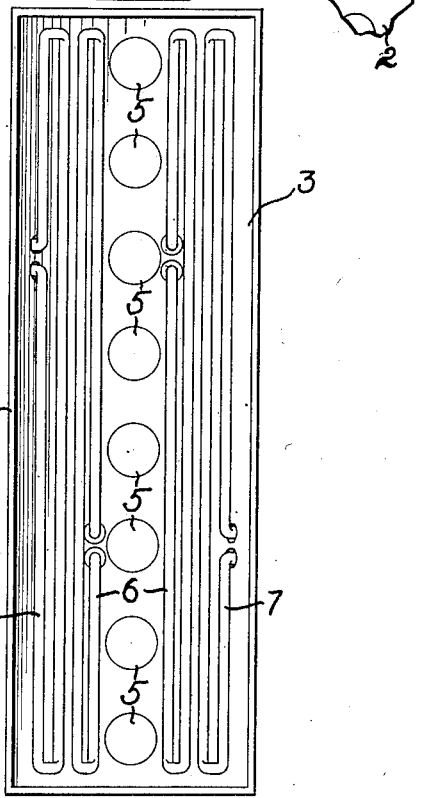
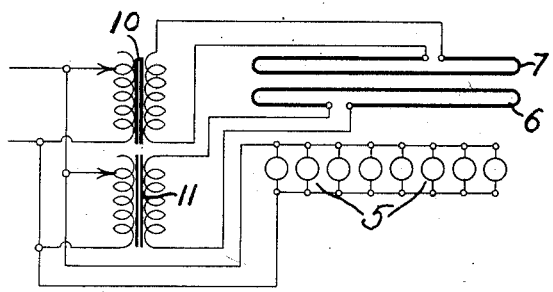
INVENTOR,
WILLI M. COHN.
BY Lippincott & Metcalf
ATTORNEYS.

Patented Aug. 15, 1939

2,169,355

UNITED STATES PATENT OFFICE 2,169,355

COLOR-GRADING SYSTEM

Willi M. Cohn, Berkeley, Calif.

Application August 17, 1936, Serial No. 96,386

8 Claims. (Cl. 88—14)

This invention relates to color grading or sorting systems and particularly to systems for grading food products such as fruits, vegetables and fish with respect to their color characteristics.

Among the objects of my invention are:

To provide a system of grading which permits the employment of relatively untrained graders; to provide a system which relieves eye strain of operatives doing the grading; and to provide a system which facilitates the obtaining of uniform pack of food products by making easier the detection of dirt or foreign substances adhering to or mixed with the products, the detecting of blemishes such as rust or decay, the detecting of non-uniform ripening, and of distinguishing between different stages of ripeness.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

In the commercial handling of nearly all food products the commercial value of the product is very largely dependent upon uniformity of the pack not only as to size and quality but as to color and ripeness. This holds true of both fruits and vegetables, such as peaches, apricots, tomatoes, citrus fruits, asparagus and beans. It is therefore customary to pass the entire pack which is to be handled before graders to select products of the same grade by eye, segregating the products of different colors into different classes. Even slight differences in coloration may make a relatively large difference in the classification of the product.

In many cases the color differences at the time of grading may be extremely slight, these slight differences being enhanced in the processing, so that a large degree of skill may be required to differentiate between the different grades.

Continued examinations of large quantities of a food product produce symptons of eye strain and fatigue very quickly, and a grader who is suffering from these symptoms is less able to make the distinctions upon which his employment depends.

My invention comprises the illumination of the objects to be graded by light whose spectral composition includes a large proportion of its energy either within the color range of the particular color with respect to which grading is being effected, or within the range of the complementary color or both. Preferably there is added to the sharply peaked illumination thus provided a general illumination having continuous or band spectrum characteristics in order that the products may present an approximately natural appearance, and the color differences being merely enhanced instead of changed completely as would be the case if only the illumination of line spectrum characteristics were used.

Referring to the drawing:

Figure 1 is a schematic diagram showing a grading belt with illumination units of a type preferred for the exercise of my invention mounted in place.

Figure 2 is a transverse sectional view of the arrangement of Figure 1, the plane of section being indicated by the line 2—2 of Figure 1.

Figure 3 is a plan view of a preferred form of lighting unit as shown in Figure 1.

Figure 4 is a wiring diagram showing one form of connection for the control of the units shown in the other figures. For simplicity only one of each pair of gas discharge tubes is shown in this diagram, the others being connected either in series or in parallel with those shown, as is well known in the art.

The nature of my invention may best be understood by considering the method as applied to certain specific products, for example, the grading of lima beans. There are two general classes of canned lima beans marketed. The first class are "green limas" which command a relatively much higher price than the "white limas" which comprise the second class. The color, of course, depends upon the degree of ripeness, and when the beans are harvested and delivered to the packing plant the classes are mixed. It has been found that as long as there is the slightest tinge of green in apparently white beans that this will be accentuated in the processing and that the cooked beans will show a uniform green color, whereas if the beans have ripened to the point where the last green tinge has disappeared no amount of processing short of the adding of artificial color will cause them to turn green. A few green beans in a can of white limas will not increase its market value, whereas white limas in a can of green beans will decrease the value greatly. It is therefore highly advantageous that a very accurate and thorough selection between the two classes be made in order that the highest price may be obtained for the pack.

In order to effect the grading in accordance with my process the beans are spread upon a sorting belt 1 which passes slowly in front of the graders, driven by the usual pulley mechanism 2. The belt is preferably white, although black belts or other colors may be used if desired.

Mounted above the belt are illuminating units 3 which concentrate a powerful illumination (preferably of the order of 150 foot candles) upon the belt.

Of this illumination, preferably about 60 per cent as measured by a foot candle meter provided with a filter to correct for eye sensitivity, has continuous or band spectrum characteristics. This proportion of the illumination may be furnished by ordinary hot filament lamps 5.

The remainder of the illumination as measured by the meter is equally divided between tubular neon lights 6 and the similar mercury vapor lights 7. The reflector 8 and the positioning of the incandescent lamps within it are designed to effect a thorough distribution of the light from the three sources so as to make the illumination of the belt uniform.

It has been found that the large percentage of green from the mercury vapor lamps so accentuates the green color of any beans in which it is present as to make their selection by the graders extremely easy. Furthermore, the mixture of the complementary red from the neon lamps upon the white belt prevents this belt from assuming a greenish tinge and further enhances the difference in coloration between the green beans and the belt. The white beans, which are actually gray or even pinkish in color, are easily distinguished under this illumination although it may be almost impossible to distinguish between them and the very faintly colored green beans under the continuous spectrum illumination alone.

In applying my invention to any specific product the selection of the illumination to be used depends very largely upon the particular color characteristics of the product itself, the defects which it is desired to detect, the range of color permissible, and the conditions in the particular plant. Thus in packing certain grades of green asparagus both the lighter and the darker stalks always have a certain amount of green present, and increasing the green effect will therefore in this case make selection harder instead of easier. In this case, therefore, I prefer to use an illumination compriing about 50 per cent of continuous characteristic and the other 50 per cent supplied by red neon lamps. The effect of this illumination is to make the green much darker in appearance, and to bring out as a strongly contrasting color any blemishes, dirt or disease which the stalks may carry.

It is not, of course, essential that band or continuous spectrum illumination be used. Thus in grading tomatoes an illumination by mercury vapor lights alone will cause the ripe fruit to appear almost perfectly black, while the unripened portions show up as a brilliant green. In general, however, the continuous spectrum illumination is highly advantageous, since under it the products have approximately their normal appearance, and it is not necessary therefore to teach unskilled operators to distinguish between color effects with which they are wholly unfamiliar, the appearances which they are accustomed to looking for being merely enhanced instead of being changed entirely.

While I have referred extensively to the use of neon and mercury lighting to provide the peaked spectrum necessary for my process, this is merely because red and green colorations are the ones most frequently met with in selection of this character. Where yellows are to be selected, either as desirable or as blemishes, sodium lights may be used. Cadmium lights may be more suitable in selecting certain reds than are the neon lights. Furthermore, white lights used with filters having narrow band-pass characteristics may be substituted for the gas discharge lamps even though such an arrangement gives only peaked spectra instead of true line spectra and is less efficient in energy conversion.

Fluorescent materials may also be used to provide the peaked spectra, and molecular gas discharge lamps with approximately white band spectra may be substituted for incandescent lamps to provide the general illumination required to give the products a natural appearance, such band spectra being considered as "substantially" continuous. Any type of illuminant known in the art may, in fact, be utilized under proper conditions within the teachings of this invention if properly adapted to the particular color selection required. It has even been found that certain types of "dirt" or contamination are fluorescent under ultra-violet bands, and this is included in the general term "color" as used in this specification and the claims.

Where different grades of product are to be packed at different times it is desirable that a certain flexibility be provided in the lighting system. Thus for "fancy" grades of foodstuffs, where the tolerances are very close, it is desirable to increase the relative amount of energy in the line spectrum illumination, e. g., by increasing the voltage on the gas discharge lamps, as by the variable ratio transformers 10 and 11, or decreasing the general illumination. Where "standard" grades are being packed the proportion of general or white illumination may be increased. In this manner the graders or sorters may choose constantly between approximately fixed limits of difference in appearance (under the grading lights), although the differences in grade may be very great.

I have found that employing the principles above set forth it is possible readily to select an illumination system adapted for the grading of almost any type of product. Thus, beside the fruits and vegetables above mentioned, it may be used to differentiate between red and pink salmon, and between other fish products which normally differ but slightly in color prior to processing.

I claim:

1. The method of color grading which comprises placing objects to be graded on a white background, directing sharply peaked illumination having an appreciable portion of its energy concentrated in the color with respect to which grading is to be effected upon said objects, simultaneously directing thereon line spectrum light having only color complementary to that with respect to which grading is to be effected, and separating out during such illumination, those of said objects showing the color with respect to which grading is to be effected.

2. The method of color grading which comprises placing objects to be graded on a white background, directing sharply peaked illumination having an appreciable portion of its energy concentrated in the color with respect to which grading is to be effected upon said objects, simultaneously directing thereon white light, and during such illumination, separating out those of said objects showing the color with respect to which grading is to be effected.

3. The method of color grading which comprises placing objects to be graded on a white background, directing sharply peaked illumination containing the color with respect to which grading is to be effected upon said objects, simultaneously directing thereon line spectrum light having only color complementary to that with respect to which grading is to be effected, also simultaneously directing thereon in addition white light, and during such illumination separating out those of said objects showing the color with respect to which grading is to be effected.

4. The method of color grading which comprises placing objects to be graded on a white background, directing peaked illumination containing the color with respect to which grading is to be effected upon said objects, simultaneously directing thereon light of a color complementary to that with respect to which grading is to be effected, also simultaneously directing thereon in addition white light, and during such illumination separating out those of said objects showing the color with respect to which grading is to be effected.

5. The method of color grading which comprises placing objects to be graded on a white background, directing peaked illumination containing the color with respect to which grading is to be effected upon said objects, simultaneously directing thereon light of a color complementary to that with respect to which grading is to be effected, also simultaneously directing thereon in addition white light, varying the relative intensities of said lights to obtain a desired resulting illumination condition separating out a desired grade of said objects as disclosed under such resulting illumination condition, effecting a further variation in relative intensities of said lights to obtain a different illumination condition as disclosed under said different illumination condition.

6. The method of color grading which comprises placing objects to be graded on a white background, directing peaked illumination containing the color with respect to which grading is to be effected upon said objects, simultaneously directing thereon line spectrum light having only color complementary to that with respect to which grading is to be effected, also simultaneously directing thereon in addition white light, varying the relative intensities of said lights to obtain desired illumination conditions, and separating out desired grades of said objects as disclosed under such desired illumination conditions.

7. The method of color grading which comprises placing objects to be graded on a white background, directing peaked illumination containing the color with respect to which grading is to be effected upon said objects, simultaneously directing thereon light of a color complementary to that with respect to which grading is to be effected, also simultaneously directing thereon in addition white light, successively varying the relative intensities of said lights, and separating out desired grades of said objects as disclosed between such successive intensity variations.

8. The method of color grading objects normally presenting a color indicating a desired classification and a somewhat different color indicating undesirability as to said classification, which comprises, illuminating such objects with light having line spectrum characteristics of the color indicating the desired classification, simultaneously illuminating said objects with light of substantially continuous spectrum characteristics whereby contrast between the color indicating desired classification and other colors will be accentuated while at the same time maintaining approximately the normal appearance of such objects, and separating objects of the desired color from those of other colors.

WILLI M. COHN.